US008930270B2

(12) United States Patent
Roskind

(10) Patent No.: US 8,930,270 B2
(45) Date of Patent: Jan. 6, 2015

(54) SMART PAYMENT INSTRUMENT SELECTION

(75) Inventor: James Roskind, Redwood City, CA (US)

(73) Assignee: AOL Inc., Dulles, VA (US)

(*) Notice: Subject to any disclaimer, the term of this patent is extended or adjusted under 35 U.S.C. 154(b) by 2080 days.

(21) Appl. No.: 10/209,559

(22) Filed: Jul. 30, 2002

(65) Prior Publication Data

US 2004/0024703 A1  Feb. 5, 2004

(51) Int. Cl.
*G06Q 20/04* (2012.01)
*G06Q 20/12* (2012.01)
*G06Q 20/34* (2012.01)
*G06Q 20/24* (2012.01)
*G06Q 20/22* (2012.01)
*G06Q 30/06* (2012.01)
*G06Q 20/10* (2012.01)
*G07F 7/10* (2006.01)
*G06Q 20/02* (2012.01)

(52) U.S. Cl.
CPC .............. *G07F 7/1008* (2013.01); *G06Q 20/12* (2013.01); *G06Q 20/357* (2013.01); *G06Q 20/04* (2013.01); *G06Q 20/341* (2013.01); *G06Q 20/24* (2013.01); *G06Q 20/227* (2013.01); *G06Q 30/06* (2013.01); *G06Q 20/102* (2013.01); *G06Q 20/02* (2013.01)
USPC ........................................................ 705/40

(58) Field of Classification Search
USPC ................................................ 705/1, 35–45
See application file for complete search history.

(56) References Cited

U.S. PATENT DOCUMENTS

| 4,689,018 | A | 8/1987 | Trinity ........................... 434/109 |
| 5,221,838 | A | 6/1993 | Gutman et al. ................. 235/379 |
| 5,438,184 | A | 8/1995 | Roberts et al. ................. 235/380 |
| 5,590,038 | A | 12/1996 | Pitroda .......................... 395/241 |
| 5,715,314 | A | 2/1998 | Payne et al. ..................... 380/24 |

(Continued)

FOREIGN PATENT DOCUMENTS

| EP | 0 917 120 | 11/1998 |
| EP | 917 120 | 5/1999 .............. G07F 19/00 |

(Continued)

OTHER PUBLICATIONS

Daswani, "Swaperoo: A Simple Wallet Architecture for Payments, Exchange, Refunds, and Other Operations"; Standford University Computer Science Department.*

(Continued)

*Primary Examiner* — Robert R Niquette
*Assistant Examiner* — Chia Yi Liu
(74) *Attorney, Agent, or Firm* — Finnegan, Henderson, Farabow, Garrett & Dunner, LLP

(57) ABSTRACT

A method and apparatus is provided for constructing and using a smart wallet with automatic selection when making a purchase in an online environment. In one embodiment of the invention, the wallet service first finds the intersection of acceptable instruments between a merchant and a user. The wallet service then intelligently selects, or at least ranks in order, the payment instruments based on value to the customer. The ranking can take into account: a) cash back rates; b) mileage rates for the specific potential purchase; and c) temporal discounts such as shipping or coupon discounts for the specific product type; etc. The system preferably presumes that a smart wallet is given information about a transaction, and has collected information about the payment instruments.

22 Claims, 2 Drawing Sheets

(56) References Cited

U.S. PATENT DOCUMENTS

| | | | | |
|---|---|---|---|---|
| 5,719,931 | A | 2/1998 | Johnson | 379/356 |
| 5,724,424 | A | 3/1998 | Gifford | 380/24 |
| 5,744,787 | A | 4/1998 | Teicher | 235/380 |
| 5,745,555 | A | 4/1998 | Mark | 379/95 |
| 5,748,737 | A | 5/1998 | Daggar | 380/24 |
| 5,825,871 | A | 10/1998 | Mark | 379/355 |
| 5,850,446 | A | 12/1998 | Berger et al. | 380/24 |
| 5,852,811 | A * | 12/1998 | Atkins | 705/36 R |
| 5,875,437 | A | 2/1999 | Atkins | 705/40 |
| 5,930,767 | A | 7/1999 | Reber et al. | 705/26 |
| 5,963,924 | A | 10/1999 | Williams et al. | 705/40 |
| 5,984,180 | A | 11/1999 | Albrecht | 235/380 |
| 5,992,888 | A | 11/1999 | North et al. | 283/56 |
| 6,014,454 | A | 1/2000 | Kunkler | 382/137 |
| 6,016,484 | A * | 1/2000 | Williams et al. | 705/39 |
| 6,076,075 | A | 6/2000 | Teicher | 705/41 |
| 6,102,287 | A | 8/2000 | Matyas, Jr. | 235/380 |
| 6,115,458 | A | 9/2000 | Taskett | 379/144 |
| 6,157,920 | A | 12/2000 | Jakobsson et al. | 705/69 |
| 6,163,772 | A | 12/2000 | Kramer et al. | 705/79 |
| 6,178,409 | B1 | 1/2001 | Weber et al. | 705/79 |
| 6,182,895 | B1 | 2/2001 | Albrecht | 235/380 |
| 6,199,051 | B1 | 3/2001 | Gifford | 705/75 |
| 6,205,437 | B1 | 3/2001 | Gifford | 705/75 |
| 6,220,510 | B1 | 4/2001 | Everett et al. | |
| 6,227,447 | B1 | 5/2001 | Campisano | 235/380 |
| 6,233,683 | B1 | 5/2001 | Chan et al. | 713/172 |
| 6,282,522 | B1 | 8/2001 | Davis et al. | 705/41 |
| 6,327,578 | B1 | 12/2001 | Linchan | 705/65 |
| 6,341,724 | B2 | 1/2002 | Campisano | 235/380 |
| 6,345,261 | B1 | 2/2002 | Feidelson et al. | 705/14 |
| 6,450,407 | B1 | 9/2002 | Freeman et al. | |
| 2002/0013728 | A1 * | 1/2002 | Wilkman | 705/14 |
| 2002/0062249 | A1 * | 5/2002 | Iannacci | 705/14 |
| 2002/0072931 | A1 | 6/2002 | Card | |
| 2002/0169668 | A1 * | 11/2002 | Bank et al. | 705/14 |

FOREIGN PATENT DOCUMENTS

| | | | |
|---|---|---|---|
| EP | 940 760 | 9/1999 | G06F 15/16 |
| EP | 949 593 | 10/1999 | G07F 7/08 |
| EP | 949 595 | 10/1999 | G07F 7/10 |
| EP | 950 972 | 10/1999 | G06F 17/60 |
| EP | 1 081 628 | 3/2001 | |
| EP | 1 107 198 | 6/2001 | G07F 7/10 |
| WO | WO 00 62184 | 10/2000 | |

OTHER PUBLICATIONS

"Chapter 8: Conclusions".*

Schlumberger, "Smarter loyalty card provides platform to realise advanced retailing environments." May 1998, p. 1, M2 Presswire, Coventry.

Barnett, M. "It's the year of the wallet". Jul. 1999, vol. 2, No. 21, p. 30. The Industry Standard.

Bandell, R. "Cashing in on customer rewards". Jul. 1999, vol. 6, No. 7, p. 16-17, Customer Loyalty Today.

Albert, G. "India: Secure Payment with SET", Apr. 2000, Business Line.

*Econimc Implications of Agent Technology and E-Commerce*; Nir Vulkan, Jul. 1998.

*.NET Passport Overview*, Mar. 20, 2002.

* cited by examiner

SMART PAYMENT INSTRUMENT SELECTION

BACKGROUND OF THE INVENTION

1. Technical Field

The present invention relates to automatic selection of payment instruments. More particularly, the present invention relates to a method and apparatus for constructing and using a payment instrument repository for making an automatic selection of a payment instrument when making a purchase in an online environment.

2. Description of the Prior Art

Online purchases have become a viable and widely-used environment for consumers to shop. Typically, a consumer goes to the World Wide Web (Web) site of a particular merchant to browse items available for purchasing or to find a particular item. Once an item is found, the consumer then proceeds to purchase that item by entering payment and shipping information to the merchant's Web site. The merchant's Web site manages the transaction and, upon confirmation, informs the consumer that the item is on its way.

Various schemes have been devised to improve upon the current state of online purchasing. For example, J.R. Trinity, U.S. Pat. No. 4,689,018, Method of Monitoring Credit Card Charges (Aug. 25, 1987) discusses a way of monitoring credit card charges on a single credit card to aid a consumer to stay within a predetermined budget. Specifically, Trinity teaches a method for monitoring an individual credit card account particularly during a predetermined monitoring period. The steps of the method include the steps of setting up a form, preferably on a piece of erasable material of wallet card size. A series of numerals is provided on the card adapted to accommodate the step of being checked so as to identify a particular amount owing on the account. A series of individual purchase amounts is identified with a series or group of spaces opposite to, or related to, each monetary amount for the step of entry of indicia identifying a purchase of that amount or approximately that amount. A masking member is provided to accommodate the step of covering the spaces associated with one or more of the monetary purchase amounts to remind and warn the user of his intent not to make purchases in those amounts in order to remain within a predetermined budget. Further groups or series of spaces is provided for the step of entering indications of amounts of payments made during the monitoring period and the total of the balance owing at any particular time or, on the other hand, the remaining balance of the user's credit limit that has not been obligated.

A universal electronic transaction card serving on behalf of a number of different cards is discussed. S. G. Pitroda, U.S. Pat. No. 5,590,038, Universal Electronic Transaction Card Including Receipt Storage and System and Methods of Conducting Electronic Transactions (Dec. 31, 1996) teaches a universal electronic transaction card ("UET card") capable of serving as a number of different credit cards, bank cards, identification cards, employee cards, medical cards and the like. A display is provided that is touch-sensitive and that provides the user with a number of graphical images which enable the user to selectively chose the type of card to use for a transaction, and to then choose a particular card to use with the transaction. After the choice is made, a graphic image appears on the display which looks like the face of the plastic card, including the account number, the user's name, the name of the card company and its logo. Thereafter, the user presents the UET card to the point of sales terminal for a sales transaction. After proper verification with the main computer of the service provider, the sales transaction information is transferred and stored in the UET card by the point of sales terminal to eliminate paper receipts and facilitate future storage, verification and analysis for billing, budgeting and financial management. The disclosure also includes methods of issuing account authorization to a UET card, a method of transferring transactional and account information between a UET card and a personal computer or mainframe computer, a method of using the UET card as a remote terminal for a mainframe computer, and a method of conducting an electronic transaction.

A device and method for displaying advertising materials to a potential purchaser coincident with the making of a financial transaction by the purchaser is taught in U.S. Pat. No. 5,992,888, Advertising Device and Method for Use at Point of Sale (Nov. 30, 1999) to W. N. Vaughn, K. R. Johnson, and G. O'Brien Garrett. Specifically, the device comprises at least one transaction recording card sized to attach to and conform to dimensions of a standard credit or debit card and includes a format for making a record of a transaction associated with the purchaser. Third party advertising material is placed on the recording card in a format which may be viewed by the purchaser at a time and place of making the record of the transaction. The method comprises the steps of a) identifying a group of purchasers having a common interest in a particular market; b) selecting a group of businesses which desire to access the group of purchasers for third party advertising purposes; c) producing at least one transaction recording card having a format for making a record of a financial transaction associated with the purchaser; d) placing the advertising material on the recording card in a format which may be viewed by the purchaser at a time and place of making the record of the financial transaction, and e) providing means for attachment of the transaction recording card and associated advertising material to a financial transaction card which can be carried in a wallet of the purchaser.

Leveraging customer loyalty to a merchant is explored in U.S. Pat. No. 6,345,261, Customer Loyalty Investment Program (Feb. 5, 2002) to R. S. Feidelson, C. E. Peters, T. C. Parrott, and J. P. Larizza. The disclosure is directed to a customer loyalty investment program system and method wherein purchase rebates are used to provide the customer with an important fund including merchant securities. The system illustratively includes a web server containing a web site and a database server containing a member information, merchant information, fund information, purchase/rebate information, on-line financial products/services information, and an input/output means. The method may include negotiating rebate percentages with merchants, registering members, receiving rebates from the merchants based on member purchases, investing the rebates in the fund, including securities of at least one merchant, and issuing shares in the fund to members based on rebates received as a result of their respective purchases. The composition of the fund preferably reflects the rebates received from the merchants. In the credit card embodiment, rebates may be received from both a credit card issuer and merchants agreeing to provide rebates based on member purchases using the credit card.

Smart card financial transactions are discussed in European Patent Application Number EP 0949593 A2, System, Method and Apparatus for Value Exchange Utilizing Value-Storing Apparatus (published Oct. 13, 1999) to J. C. Kawan, M. Kogen, and R. Munoz. A system, method and apparatus for exchanging value using a smart card in a financial transaction is disclosed. The system includes a smart card having a contact interface and a contactless interface interactive with a closed purse application and an open purse application controlled by a microprocessor. The closed purse application contains application-specific value, while the open purse contains general value. The application-specific value and general value are each compatible within the system of the invention to perform and settle the financial transaction. The financial transaction may include the smart card communicating with a load terminal or a transaction terminal to add or change the amount of value on the smart card. Further, included is auto-load functionality for adding an amount of value to the smart card. Finally, applications such as a transportation application and a loyalty application are described.

Digital wallet architecture is discussed in *SWAPEROO: A Simple Wallet Architecture for Payments, Exchanges, Refunds, and Other Operations;* Neil Daswani, Dan Boneh, Hector Garcia-Molina, Steven Ketchpel, and Andreas Paepcke; Stanford University, Computer Science Department. Stanford, Calif. 94305. Specifically proposed is a digital wallet architecture that is extensible, i.e. can support multiple existing and newly developed instruments and protocols, is symmetric, i.e. has common instrument management and protocol management interfaces across end-user, vendor, and bank applications, is non-web-centric, i.e. can be implemented in non-web environments, and is client-driven, i.e. the user initiates all operations, including wallet invocation.

Finally, 2002 Microsoft Corporation discloses an online wallet on its Web page, http://www.microsoft.com/netservices/passport/overview.asp, .NET passport Overview, Microsoft .net services, NET Passport express purchase. Specifically, such service allows for online purchasing by enabling a consumer to create a .NET Passport "wallet" that stores their billing and shipping information in a secured location. The disclosure further discusses how consumers can make online purchases at any participating .NET Passport express purchase sites by signing in to their wallet and, with a single click, sending their purchase information to the merchant instantly, eliminating the need to retype it. The data is sent securely using SSL encryption.

What is lacking in the online purchasing market is a mechanism for providing the best value to the consumer based upon the best combination of payment instrument and discount, coupon, or any other promotional advantage offered to the consumer.

Typically, today, a consumer receives coupons, discounts, and any other promotional advantage offering through the U.S. postal service, by clipping coupons out of a newspaper, saving online coupons, and the like. In other words, the consumer tracks and manages such redeemable savings items.

What's more, these coupons, discounts, and the like many times are connected to particular payment instrument banks. For example, a consumer's a credit card company may offer a discount on a motel room rate to the consumer if that card is used. So, it is up to the consumer at that point of sale, to be cognizant that a discount exists for at least one of his or her payment instruments.

The problem has not been solved of providing automatic tracking of discounts, coupons, etc., and automatic suggesting of a best payment instrument to the consumer at the point of sale or transaction. Also, while static advantages of using a particular payment instrument are generally known to a consumer, such as frequent flier miles, the user has to make a concerted effort to keep track of dynamic discounts, such as those in effect "until the end of the month," or "until year-end," and so on.

Finally, while consumers are now used to providing personal and private payment instrument information online for a single payment instrument, consumers are still somewhat skeptical to provide personal and private information pertaining to more than one of, or all of, their payment instruments.

Such reluctance of providing more information to an online purchasing system may not be in the best interest of the consumer, as better decisions can be made with more information.

Conversely, typically today, merchants do not provide purchasing information of the consumer when requesting payment for the item purchased by that consumer. Again, such reluctance of the merchant to provide more information about a purchase may not necessarily be in the best interest of the merchant. It is possible that if the merchant provided more information about each purchase, such as what was purchased and how many, etc., then this information can be used to the advantage of the merchant, such as facilitate future purchases from the merchant.

It would therefore be advantageous to automatically store, track, and manage a user's coupons, discounts, promotional offerings, etc., on a regular basis.

It would be advantageous to provide value to a user by suggesting the best payment instrument that can save the user money, based upon the stored and tracked coupons, discounts, and the like.

It would be advantageous to provide an incentive to both consumers and merchants to put forth more information, respectively, so that the information put forth can be used to provide them with further advantages and opportunities.

SUMMARY OF THE INVENTION

A method and apparatus is provided for constructing and using a smart wallet, i.e. a repository of payment instruments, such as, for example, credit cards, with automatic selection when making a purchase in an online environment. In one embodiment of the invention, the wallet service first finds the intersection of acceptable instruments between a merchant and a user. For example, the invention matches a list of user held credit cards against a list of acceptable credit cards at a merchant. The wallet service then intelligently selects, or at least ranks in order, the payment instruments based on value to the customer. The ranking can take into account: a) cash back rates; b) mileage rates for the specific potential purchase; and c) temporal discounts such as shipping or coupon discounts for the specific product type; etc. The act of automatically making a selection of a payment instrument, such as a credit card, in an online environment is analogous to what a human does when buying things at a store. The advantage is that an automatic system can integrate all the discount notices and coupons that are typically mailed to a cardholder. The system preferably presumes that a smart wallet is given information about a transaction, and has collected information about the payment instruments.

DETAILED DESCRIPTION OF THE INVENTION

A method and apparatus is provided for constructing and using a smart wallet, i.e. a repository of payment instruments, such as, for example, credit cards, with automatic selection when making a purchase in an online environment. In one embodiment of the invention, the wallet service first finds the intersection of acceptable instruments between a merchant and a user. For example, the invention matches a list of user held credit cards against a list of acceptable credit cards at a merchant. The wallet service then intelligently selects, or at least ranks in order, the payment instruments based on value to the customer. The ranking can take into account: a) cash back rates; b) mileage rates for the specific potential purchase; and c) temporal discounts such as shipping or coupon discounts for the specific product type; etc. The act of automatically making a selection of a payment instrument, such as a credit card, in an online environment is analogous to what a human does when buying things at a store. The advantage is that an automatic system can integrate all the discount notices and coupons that are typically mailed to a cardholder. The system preferably presumes that a smart wallet is given information about a transaction, and has collected information about the payment instruments.

It should be appreciated that the term smart wallet is used in the discussion to mean any of, but not limited to, smart wallet application, smart payment instrument selection, smart financial instrument selection, a repository of payment instruments with automatic selection, and the like. Likewise, the term merchant is used interchangeably herein with merchant application, in the appropriate context.

Figure 1:
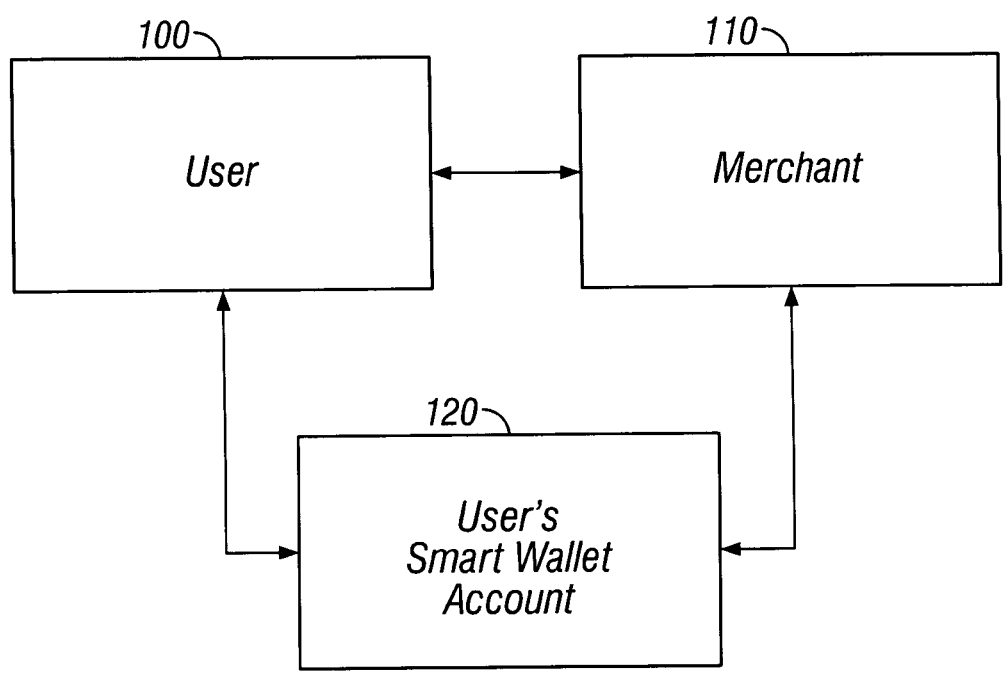
FIG. 1 is a high level, simplified schematic diagram of the main components and their interactions according to one embodiment of the invention.

FIG. 1 is a high level, simplified schematic diagram of the main components and their interactions according to one embodiment of the invention. A user 100 decides to purchase a product or service online from a merchant's application display 110 including products and services. For example, the user 100 could be browsing the merchant's Web page and clicks the appropriate button, link, etc. to indicate a purchase is desired. The merchant 110 receives the message from the user 100 of the desire to purchase the item. Accordingly, the merchant proceeds to obtain funds for the item. The merchant then messages the user's pre-established account (smart wallet) application 120 giving information about the item purchased, as well as indicating to the smart wallet that the user requests purchasing the item. The smart wallet 120 then automatically processes the information about the item from the merchant 110 integrated together with discount information previously tracked and with the user's payment instruments available to the user at that time, and with the payment instruments acceptable by the merchant, to obtain a prioritized list of the user's payment instruments which bring the best value to the user. The smart wallet 120 then messages the user 100 with the processed (prioritized) list. The user 100 chooses the payment instrument to use from the list of prioritized suggestions. In this scenario, the smart wallet messages the merchant in return with the chosen payment instrument, and the merchant proceeds to ship the item to the user.

Figure 2:
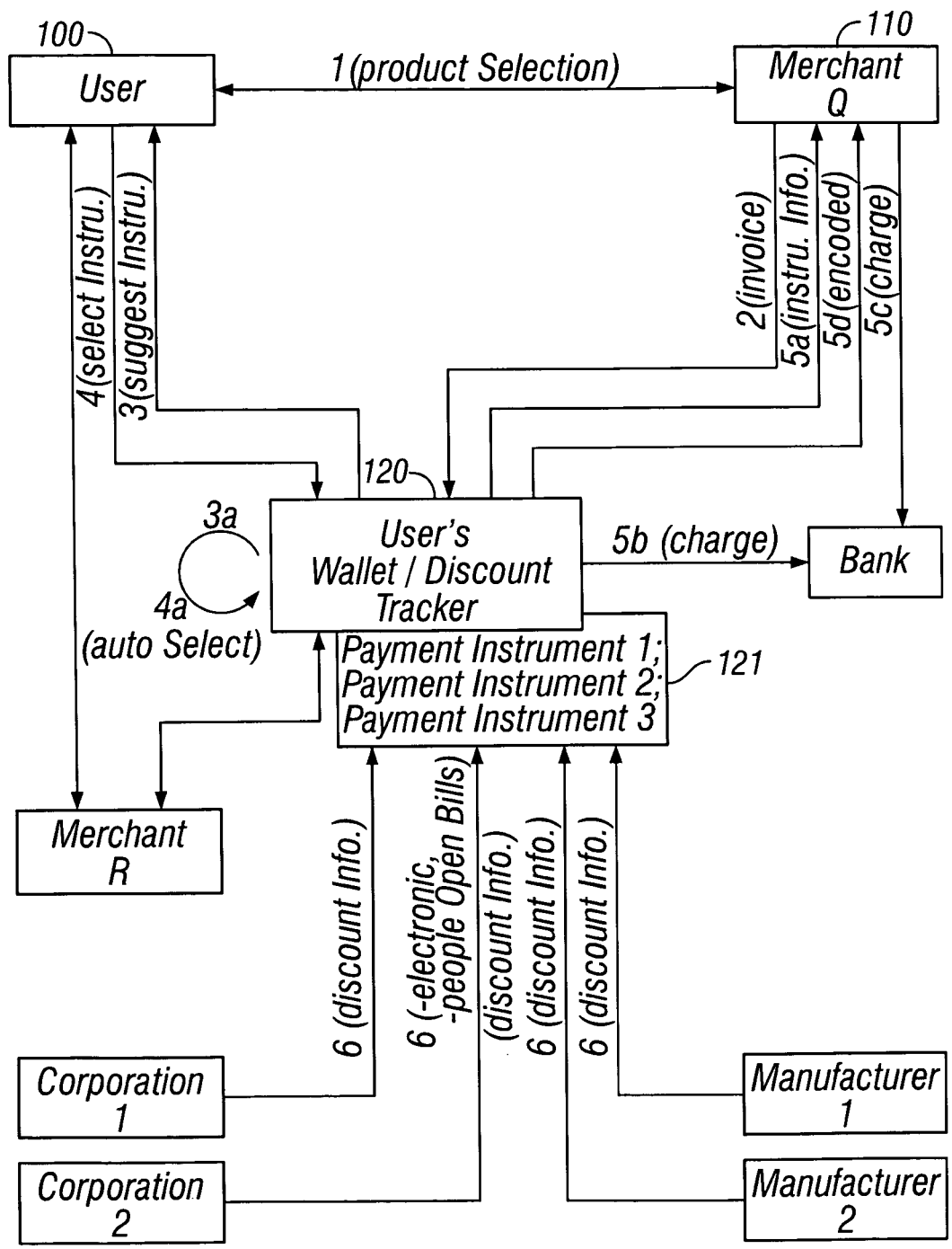
FIG. 2 is a schematic diagram of components of FIG. 1 and of various other components and sources of information according to the invention.

A variety of further embodiments of the invention can be described with reference to FIG. 2, where FIG. 2 is a schematic diagram of components of FIG. 1 and of various other components and sources of information according to the invention. In one scenario, a user 100 has a smart wallet account application 120 and communicates with a merchant application 110, perhaps by browsing the merchant's Web page. The user could be communicating with multiple merchant applications, as well, such as Merchant R. In this particular example, the smart wallet application contains three payment instruments 121, such as three different types of credit cards. The user 100 then decides to purchase an item and indicates the product selection 1 to the merchant application 110. The merchant application then sends notification 2 to the user's smart wallet account application 120.

The user can be doing a number of things before actually deciding upon a purchase. For example, the user can go back and forth looking at a variety of Web pages. The user can be adding items to his or her shopping card, etc. At some point, however, the user decides to make a purchase transaction.

Continuing with the example, Merchant Q sends an invoice 2 to the user's smart wallet application 120. The smart wallet application 120 suggests a payment instrument 3 to the user 100. There is a limitless number of ways the smart wallet can suggest a payment instrument.

According to a preferred embodiment of the invention and as in FIG. 1, the smart wallet application processes information it has: the number of and types of payment instruments of the user; any discount information provided to the smart wallet from manufacturers, financial instrument companies, and the like; the types of payment instruments accepted by the Merchant Q; and a given priority with which to rank the possible suggestions. The user 100, most likely having reviewed the ranked suggestions, selects the payment instrument and conveys that selection 4 back to the smart wallet application 120. In the example, the smart wallet application 120 then returns the payment instrument information 5A to Merchant Q for processing and shipping the item to the user.

In an alternative embodiment of the invention, the smart wallet application 120 has a mechanism by which a payment instrument is automatically suggested 3a and accepted 4a based on predetermined criteria and bypassing user intervention.

In another alternative embodiment of the invention, the smart wallet application 120 contacts a bank 5B, i.e. a banking complex, for charging the payment. Or, in yet another alternative embodiment of the invention, the merchant 110 goes directly to the bank 5C.

In yet another embodiment of the invention, the payment instrument information is sent encoded 5D.

In addition to and most likely in parallel to and simultaneously with the above, different credit card companies and other financial instrument companies are providing and/or sending on an on-going basis discount information, lists, etc., 6 to the smart wallet application for storing and tracking. The different ways that the discount information is channeled to the smart wallet application is limitless. For example, one channel can be by electronic means. Or, a team of people, such as data processors, can be hired to physically open each piece of mail, set aside the discounts notices, and type the discount information data into a database of some sort accessible to the smart wallet application.

It should be appreciated that a manufacturer can also be a merchant or vendor, etc., and that the role of the merchant is not limited by the actual entity of the merchant. This is because today there are some manufacturers that also fulfill the role of merchant. For example, a computer manufacturer may assemble computers, and also ship out the assembled computers with a third party's printer. Conversely, the roles of the manufacturers and financial instrument companies are not limited by their entity descriptions. In essence, the smart wallet application can process the required information regardless of their source.

It should also be appreciated that the smart wallet application, as a repository for discount information, can be used to further benefit the user, the merchant, the manufacturers, and the financial instrument companies. For example, if a user desires to shop for a computer, the user can access his or her smart wallet application and use it as a discount tracker to review available discounts. Thus, a merchant, manufacturer, and financial instrument company all have incentives to share, put forth, information into the user's smart wallet. It increases their respective chances of being used.

The smart wallet can track all the financial instrument discounts to be had. It tracks all the manufacturing discounts, such as free shipping offers, rebates, two for one's, special promotions, etc., that typically are too numerous and erratic for any one user to keep track of on his or her own. It should be appreciated that because the smart wallet performs a needed service of tracking all relevant discounts for the user, the user has incentive to put forth information about most of, if not all of, his or her financial instruments.

In fact, the smart wallet application provides incentive for all parties to put forth information that otherwise might be viewed as private, because each party obtains greater value. By putting forth more information than typical, each party increases opportunity which leads to increased gains and benefit.

The preferred embodiment of the invention provides for multiple financial instrument selections for a single purchase. For example, suppose a user purchases a printer from company A and a modem from Company B. Suppose also that Financial Instrument Company C offers a discount for Company B's modem and a Financial Instrument Company D offers a discount for Company A's printer. In this case, the smart wallet application suggests splitting the purchase into two appropriate and respective invoices for charging Company C for Company B's modem and charging Company D for Company A's printer, respectively, to obtain both discounts.

Manufacturers, merchants, financial instruments, etc., have incentive to give information to the smart wallet application because, in the case of a bundled purchase, if no other financial instrument company offers a discount, then the smart wallet application may suggest that first financial instrument company offering the discount gets charged the entire bundled purchase.

Therefore, while today's typical user is reluctant to put forth personal information about his or her multiple credit cards online, the user has incentive to do so with the smart wallet application, because the smart wallet application returns value by tracking and finding discounts for the user.

Likewise, while today's merchant does not want to be bothered to put forth invoice information other than simply the dollar amount when charging a wallet, the merchant now has incentive to do so with the smart wallet application, because the smart wallet application returns value by creating more opportunities for business deals and better purchase prices. For example, a merchant will provide the details of an invoice if the merchant knows that the merchant get paid the full price when the consumer gets a discount, because the credit card company selected by the invention covers the difference in cost due to the discount.

It should also be appreciated that once the smart wallet is in a viable position of having a lot of stored financial instrument information from customers and a stored list of invoices of all the items the customers bought, the smart wallet application can also make other types of suggestions. For example, the smart wallet application might predict purchasing needs of a consumer. For example, the smart wallet might convey to the user, "You purchased an ink cartridge six months ago. Would you like to know that a sale on ink cartridges is now being offered by Company W?"

It should be emphasized that the smart wallet tracks temporal discounts in addition to static discounts. That is, not only does the smart wallet track discounts that are static, such as frequent flyer miles, but it tracks those discounts which are offered for a relatively short period of time, such as a month, two weeks, "expires at end of the month," or "expires end December $31^{st}$," etc.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer-implemented method for automatically selecting a payment instrument in an online environment, comprising the steps of:
    notifying, by a user's Web browser, a merchant application of the user's desire to make a purchase transaction for an offered product or service, said merchant application comprising a merchant's Web page;
    responsive to said notifying said merchant application, said merchant application sending information of said purchase transaction to a corresponding smart wallet application, said smart wallet application being capable of electronically receiving discount information and having a repository of stored information about one or more payment instruments, said stored information comprising number of and types of payment instruments of the user, discount and incentive information from manufacturers, discount and incentive information from financial instrument companies, types of payment instruments accepted by said merchant, and a predetermined priority with which to rank suggested payment instruments;
    responsive to receiving said purchase transaction information from said merchant application and using said stored information, said smart wallet application automatically processing said purchase transaction information to determine, rank based on said predetermined priority, and suggest at least one payment instrument from said one or more payment instruments, wherein said suggested at least one payment instrument provides a best value to said user;
    selecting a payment instrument from said suggested at least one payment instrument; and
    responsive to a determination that only the selected payment instrument provides a discount to said user, said smart wallet application suggesting bundling multiple purchases and suggesting charging said bundled multiple purchases to said selected payment instrument.

2. The method of claim 1, wherein said sent information from said merchant application further comprises payment instruments acceptable by said merchant application.

3. The method of claim 2, said processing step further comprising the step of:
    said smart wallet finding an intersection of said stored one or more payment instruments and said payment instruments acceptable by said merchant application.

4. The method of claim 1, further comprising the step of:
    said smart wallet application sending said selected payment instrument information to said merchant application for further processing.

5. The method of claim 1, further comprising the step of:
    said smart wallet application automatically suggesting and selecting said payment instrument based on predetermined criteria.

6. The method of claim 1, further comprising the step of:
    said smart wallet application contacting a bank with said selected payment instrument.

7. The method of claim 1, further comprising the step of:
    said merchant application contacting a bank with said selected payment instrument.

8. The method of claim 1, wherein said sent selected payment instrument information is encoded.

9. The method of claim 1, further comprising the step of:
providing discount information to said smart wallet application on an on-going basis for storing and tracking.

10. The method of claim 9, wherein said providing discount information step further comprises any of the steps of, or any combination of steps of, but by no means limited to the steps of:
sending said discount information by electronic means; and
data processors inputting said discount information.

11. The method of claim 1, further comprising the step of:
using said smart wallet application as a discount tracker to review available discounts.

12. The method of claim 1, further comprising the step of:
providing for multiple financial instrument selections for a single purchase to obtain multiple discounts.

13. The method of claim 1, further comprising the step of:
said smart wallet application making purchasing needs suggestions based on stored information.

14. The method of claim 1, wherein said discount information comprises any of:
temporal discounts;
cash back rates; and
mileage rates.

15. The method of claim 1, wherein said payment instrument is any of a credit card and a debit card.

16. A computer-implemented method for automatically selecting a payment instrument in an online environment, comprising the steps of:
notifying, by a user's Web browser, a merchant application of the user's desire to make a purchase transaction for an offered product or service, said merchant application comprising a merchant's Web page;
responsive to said notifying said merchant application, said merchant application sending information of said purchase transaction to a corresponding smart wallet application, said smart wallet application being capable of electronically receiving discount information and having a repository of stored information about one or more payment instruments, said stored information comprising number of and types of payment instruments of the user, types of payment instruments accepted by said merchant, and a predetermined priority with which to rank possible suggested payment instruments;
responsive to receiving said purchase transaction information from said merchant application and using said stored information, said smart wallet application automatically processing said purchase transaction information to determine, rank based on said predetermined priority, and suggest at least one payment instrument at the time of purchase from said one or more payment instruments, wherein said suggested at least one payment instrument provides a best value to said user;
automatically selecting a payment instrument from said suggested at least one payment instrument at the time of purchase: and
responsive to a determination that only the selected payment instrument provides a discount to said user, said smart wallet application suggesting bundling multiple purchases and suggesting charging said bundled multiple purchases to said selected payment instrument.

17. A system for automatically selecting a payment instrument in an online environment, comprising:
a first computer processor executing a Web browser a application configured for notifying a merchant application of a desire to make a purchase transaction for an offered product or service, said merchant application comprising a merchant's Web page application;
a second computer processor executing the Web page application configured for, responsive to said notifying said merchant application, sending information of said purchase transaction to a corresponding smart wallet application, said smart wallet application being capable of electronically receiving discount information and having a repository of stored information about one or more payment instruments, said stored information comprising number of and types of payment instruments of a user, types of payment instruments accepted by said merchant, and a predetermined priority with which to rank possible suggested payment instruments, wherein, responsive to receiving said purchase transaction information from said merchant application and using said stored information, said smart wallet application:
automatically processes said purchase transaction information to determine, rank based on said predetermined priority, and suggest at least one payment instrument from said one or more payment instruments, said suggested at least one payment instrument providing a best value to said user;
automatically selects at least one payment instrument from said suggested at least one payment instrument; and
suggests bundling multiple purchases and suggests charging said bundled multiple purchases to a single payment instrument, responsive to a determination that only said selected payment instrument provides a discount to said user.

18. The method of claim 1, wherein the smart wallet application is executed by at least one computer processor.

19. The method of claim 1, wherein each of the steps are performed by at least one computer processor.

20. The method of claim 16, wherein the smart wallet application is executed by at least one computer processor.

21. The method of claim 16, wherein each of the steps are performed by at least one computer processor.

22. The system of claim 17, wherein the smart wallet application is executed by at least one computer processor.

* * * * *